(12) United States Patent
Dacko (10) Patent No.: US 8,132,700 B2
(45) Date of Patent: Mar. 13, 2012

(54) BICYCLE ACCESSORY MOUNTING SYSTEM (75) Inventor: Daniel Dacko, Madison, WI (US)

(73) Assignee: Trek Bicycle Corporation, Waterloo, WI (US)

(*) Notice: Subject to any disclaimer, the term of this patent is extended or adjusted under 35 U.S.C. 154(b) by 1001 days.

(21) Appl. No.: 11/832,886

(22) Filed: Aug. 2, 2007

(65) Prior Publication Data
US 2009/0032561 A1 Feb. 5, 2009

(51) Int. Cl.
B62J 11/00 (2006.01)
B62J 6/00 (2006.01)

(52) U.S. Cl. ........ 224/431; 224/445; 224/463; 224/420; 224/425; 224/427

(58) Field of Classification Search .................. 224/420, 224/427, 431, 441, 445, 448, 463, 929, 935; 70/18; 24/16 PB; B60R 7/06, 11/00
See application file for complete search history.

(56) References Cited

U.S. PATENT DOCUMENTS

| | | | |
|---|---|---|---|
| 4,597,031 A * | 6/1986 | Tsuyama | 362/476 |
| 4,727,630 A * | 3/1988 | Alan | 24/593.11 |
| 4,768,741 A | 9/1988 | Logsdon | |
| 5,181,774 A * | 1/1993 | Lane | 362/549 |
| D351,036 S * | 9/1994 | Tsushi | D26/29 |
| 5,436,810 A | 7/1995 | Sutherland et al. | |
| 5,477,425 A * | 12/1995 | Sun et al. | 362/476 |
| 5,641,220 A | 6/1997 | Sutherland et al. | |
| 5,735,441 A * | 4/1998 | Fujimoto | 224/420 |
| 5,921,669 A | 7/1999 | Taylor et al. | |
| 6,095,386 A * | 8/2000 | Kuo | 224/448 |
| 6,186,451 B1 * | 2/2001 | Benoit | 248/74.3 |
| 6,227,688 B1 | 5/2001 | Taylor et al. | |
| 6,264,351 B1 | 7/2001 | Taylor et al. | |
| 6,322,279 B1 | 11/2001 | Yamamoto et al. | |
| 6,382,570 B1 * | 5/2002 | Simpson et al. | 248/74.3 |
| 6,507,980 B2 | 1/2003 | Bremicker | |
| 6,568,838 B2 | 5/2003 | Taylor et al. | |
| 6,572,249 B2 * | 6/2003 | Bailey | 362/473 |
| 6,953,260 B1 | 10/2005 | Allen | |
| 7,070,295 B1 * | 7/2006 | Lee | 362/191 |
| 7,077,302 B2 * | 7/2006 | Chuang | 224/420 |
| 7,121,679 B2 | 10/2006 | Fujimoto | |
| 7,293,900 B1 * | 11/2007 | Lee | 362/476 |
| 7,311,233 B2 * | 12/2007 | Chen | 224/425 |
| D595,884 S * | 7/2009 | Liao et al. | D26/60 |
| 7,661,858 B2 * | 2/2010 | Chuang | 362/474 |
| 2002/0159253 A1 | 10/2002 | Dalebout et al. | |
| 2006/0124679 A1 * | 6/2006 | Chen | 224/425 |
| 2007/0001075 A1 | 1/2007 | Niece | |
| 2007/0044586 A1 | 3/2007 | Ishikawa | |
| 2008/0035690 A1 * | 2/2008 | Hsai | 224/425 |
| 2009/0113946 A1 * | 5/2009 | Baumgarten | 70/18 |
| 2010/0132167 A1 * | 6/2010 | Ueda et al. | 24/16 R |

FOREIGN PATENT DOCUMENTS
WO  WO 96/19132  6/1996

* cited by examiner

Primary Examiner — Justin Larson
(74) Attorney, Agent, or Firm — Boyle Fredrickson, S.C.

(57) ABSTRACT

An accessory mounting system having a body for being removably engaged with a supporting structure. The body includes a pliable strap for securing the body to a variety of profiles. An operator is connected to the body and configured to engage the strap such that a portion of the strap removably engages the body. A cap portion is rotatably connected to the body and is configured to removably engage an accessory. Another operator interacts with the accessory such that the accessory can be selectively secured to the supporting structure.

20 Claims, 5 Drawing Sheets

BICYCLE ACCESSORY MOUNTING SYSTEM

BACKGROUND OF THE INVENTION

The present invention relates to bicycle accessory mounting systems and, more particularly, to an accessory mounting system for being secured to an underlying structure independent of the construction or configuration of the underlying structure.

Interest in recreational and/or competitive cycling continues to increase. The consequence of this popularity of bicycle riding has been a growing presence of bicycle operators or riders or cyclists, of all ages, on public roads or off road trails. Further, as the recreation has grown, typical bicycle excursions or trips have lengthened in extent and, concomitantly a great variety of lighter, multi-geared and faster bicycles have entered the marketplace. Increasingly, as bicycle trips are planned for longer durations and distances, riders commonly prefer to carry several accessories with them during such excursions. One such accessory is a light. As trips extend into later hours, riders are frequently encountered on the highways or trails at dusk and into nightfall. The safety aspects involved with such night riding are apparent and the necessity for providing a good light source has assumed considerable importance.

Many bicycle lights are provided which can be secured to a bicycle. These light systems commonly include a battery, a generator that is powered by operation of the bicycle, or some combination thereof. Although such systems generally provide adequate illumination of a path directly in front of a bicycle, such systems are less than ideal. It is commonly desired during night riding to light a direction other than a direction directly in front of the bicycle. During use, such illumination is near impossible with the light attached to the bicycle. That is, due to the lights connection with the bicycle or position thereto to the rider, it is frequently infeasible for the operator to reposition the light for illumination in a direction that is even slightly skewed from the direction of travel. Accordingly, it is desired to provide a light connection system for allowing multi-directional aiming of the light.

A further consideration for such systems is the ability of simply and efficiently transfer the accessory from one structure of another. Whereas some riders have only one bicycle, many riders have different bicycles for different terrain. That is, many riders have a street or road bike and an off-road or mountain bike. The construction of such bicycles is markedly different. Accordingly, it is commonly required to have a different light system attached to each bicycle. Such a requirement increases the cost associated with maintaining such equipment of use during a variety of conditions.

Regardless of the number of bicycles owned and operated, not all riders prefer the same physical location for such accessories. Additionally, one rider may prefer different accessory locations as determined by riding conditions or experience. That is, some riders may prefer a bicycle light attached to the bicycle such that the light always points in the direction of travel of the bicycle whereas other riders may prefer a light that otherwise secured to the rider such as by clothing, a helmet, or the like. Accordingly, it is desired to provide an accessory mounting structure that is securable to any of a number of underlying structures and that is securable thereto generally independent of the configuration, shape, and size of the underlying structure.

Another consideration for such accessory mounting systems is the ease with which the accessory can be removed from the underlying structure. During night use, and particularly during endurance racing events, riders are commonly required to perform activities that are only tangentially related to, or remote from, operation of the bicycle. These activities can include adjusting gear, performing maintenance or repairs, setting camp, etc. Lighting of such activities commonly requires a rider to carry an additional light source or otherwise orient the entire bicycle with respect to the task being performed. Understandably, such alternatives either increase the gear transported by the rider or otherwise increase the time associated with completion of the task with less than desired illumination. Furthermore, if the accessory can be quickly removed from the underlying structure, a rider is more likely to remove the accessory that to leave the accessory attached to the bicycle and thereby exposed to persons with ill intentions. Accordingly, it is also desired to provide an accessory mounting system wherein the accessory can be secured to the bicycle and yet quickly and efficiently be removed therefrom to increase the uses of the underlying accessory.

In view of the above, it will be apparent to those skilled in the art that there exists a need for an improved accessory mounting system that is engageable with a variety of bicycle configurations and components, is constructed to engage an accessory such that the accessory can be oriented independent of the orientation of the accessory mounting structure, is constructed such that the accessory and the accessory mounting structure can be quickly and efficiently removed and engaged with the mating structure, that is simple and cost effective to produce, is lightweight and robust, and is applicable across a variety of product platforms.

BRIEF DESCRIPTION OF THE INVENTION

The present invention provides a system and method of forming a bicycle accessory mounting system that overcomes one or more of the aforementioned drawbacks. One aspect of the invention includes an accessory mount constructed to cooperate with an accessory such that the accessory is independently positionable relative to the mount. The mount includes a body and a strap constructed to engage an underlying structure such as a bicycle or a bicycle helmet. The strap is pliable to secure the mount relative to the underlying structure generally independent of the cross-sectional shape of the underlying structure. Preferably, the accessory mount includes a first operator to allow selective securing of the strap and a second operator to allow selective engagement with the accessory. The accessory mount provides a mounting system that is highly versatile and can easily be tailored to a given users preferences.

Another aspect of the invention discloses an accessory mounting system having a body with a passage and an open end. A cap portion is rotatably connected to the body generally opposite the open end. A first operator is connected to the cap portion for selectively securing an accessory to the body. A pliable member includes a first end that is connected to the body and a second end normally not connected to the body. The pliable member has a number of ribs and is adapted for passing into the passage of the body. A second operator is connected to the body and is adapted to releasably engage a rib to selectively secure the second end to the body and to close the open end of the body. Such a construction provides a mounting system that is securable to virtually any structure associated with a bicycling and can be quickly transported between different supporting structures.

Another aspect of the invention discloses a bicycle light mount that has a first portion and a second portion. The second portion is rotatably connected to the first portion. The second portion is also constructed to removably engage a light. A strap is connected to the first portion and is constructed of a first material. A portion of the strap also includes a number of ribs that are formed of a second material. A latch is connected to the first portion and is constructed to selectively engage the number of ribs of the strap so as to form a closed passage having a variable cross-sectional area. The mount provides a means for securing a light to structures that have varied cross-sectional areas and shapes thereby providing a highly functional light mount system.

A further aspect of the invention discloses a bicycle accessory mounting system that has a mount portion and an adapter portion. The adapter portion is rotatably connected to the mount portion and is constructed to removably engage a bicycle accessory. The system includes a strap that has one end connected to the mount portion and another end removably engageable with the mount portion to define a closed clamp section. A plurality of teeth extend from a portion of the strap. A catch is attached to the mount portion and is constructed to engage a first tooth and a second tooth such that, the closed clamp section has a first area when the catch is engaged with the first tooth and a second area when the catch is engaged with the second tooth.

It is appreciated that these aspects are not mutually and/or individually exclusive with respect to one another. These and various other aspects, features, and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
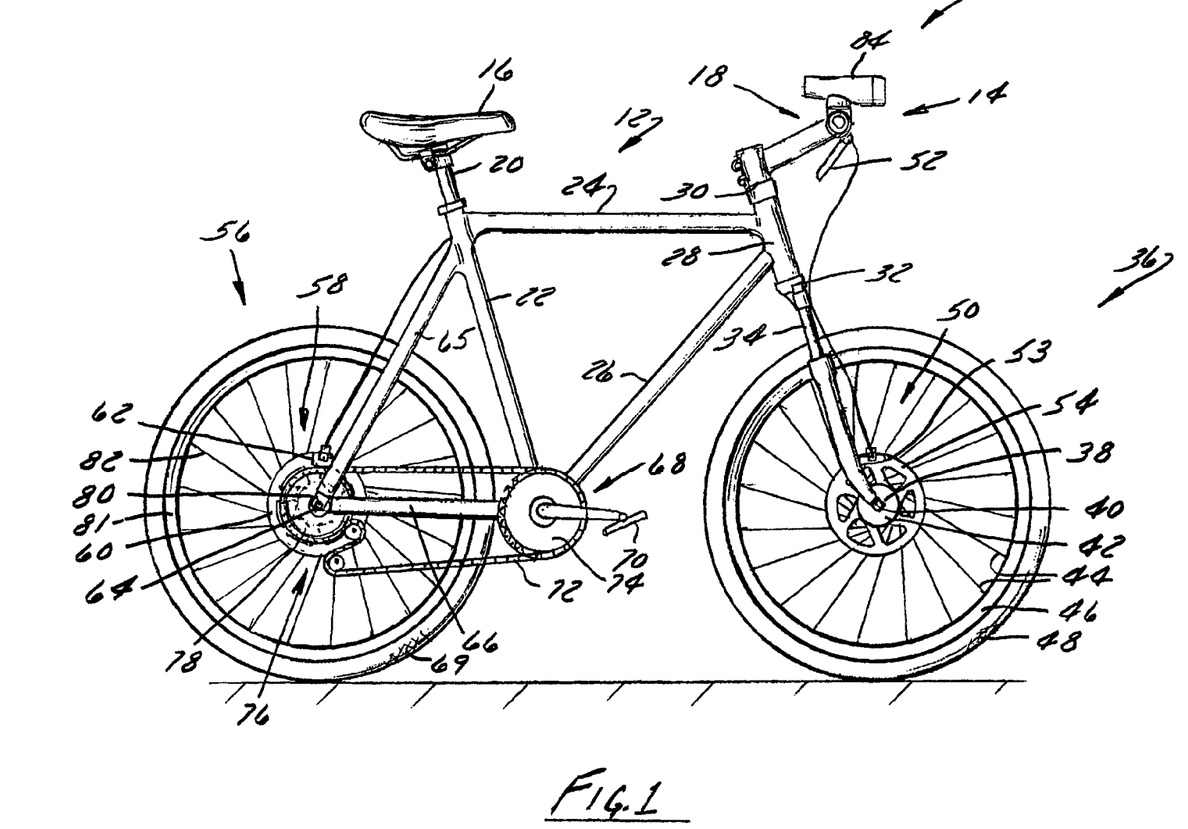
FIG. 1 is an elevational view of the bicycle equipped with an accessory mounting system according to the present invention.

FIG. 1 shows a bicycle 10 equipped with an accessory mounting system 14 according to the present invention. Bicycle 10 includes a seat 16 that is slidably attached to a frame 12. A seat post 20 is connected to seat 16 and slidably engages a seat tube 22 of frame 12. A top tube 24 and a down tube 26 extend forwardly from seat tube 22 to a head tube 28 of frame 12. A handlebar or handlebar assembly 18 is connected to a stem tube 30 that passes through head tube 28 and engages a fork crown 32. The position of handlebar assembly 18 is fixed relative to stem tube 30 and fork crown 32 such that handlebar assembly 18 and fork crown 32 rotate together relative to head tube 28.

A pair of forks 34 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42. Handlebar assembly 18 is connected to bicycle 10 such that side-to-side rotation of the handlebar assembly 18 rotates wheel assembly 36 and accessory mounting system 14 relative to a longitudinal plane of bicycle 10.

Bicycle 10 includes a front brake assembly 50 having an actuator 52 attached to handlebar assembly 18. Brake assembly 50 includes a pair of brake pads 53 positioned on generally opposite sides of a rotor 54 secured to front wheel assembly 36. Brake rotor 54 is secured to front wheel assembly 36 proximate hub 42. Alternatively, brake pads 53 could be constructed to engage a sidewall of rim 46. Regardless of the relative engagement, brake pads 53 providing a stopping or slowing force to front wheel assembly 36. A rear wheel assembly 56 includes a disc brake assembly 58 having a rotor 60 and a caliper 62 that are positioned proximate a rear axle 64. A rear wheel 69 is positioned generally concentrically about rear axle 64. Understandably, either or both of front wheel assembly 36 and rear wheel assembly 56 could be equipped with a brake assembly generally similar to a rim brake systems or a disk brake system as shown.

A seat stay 65 and a chain stay 66 offset rear axle 64 from a crankset 68. Crankset 68 includes a pair of pedals 70 that is operationally connected to a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 of rear wheel 69. A number of spokes 82 extend radially between hub 80 and a rim 81 of rear wheel 69 of rear wheel assembly 56. As is commonly understood, rider operation of pedals 70 drives chain 72 thereby driving rear wheel 69 which in turn propels the rider of bicycle 10. It is appreciated that the foregoing description of bicycle 10 is merely exemplary of a bicycle for use with the present invention. It is appreciated that accessory mounting system 14 may be secured to other recreational devices and/or other structures associated with operation of bicycle 10, such as a rider's helmet or the like.

Figure 2:
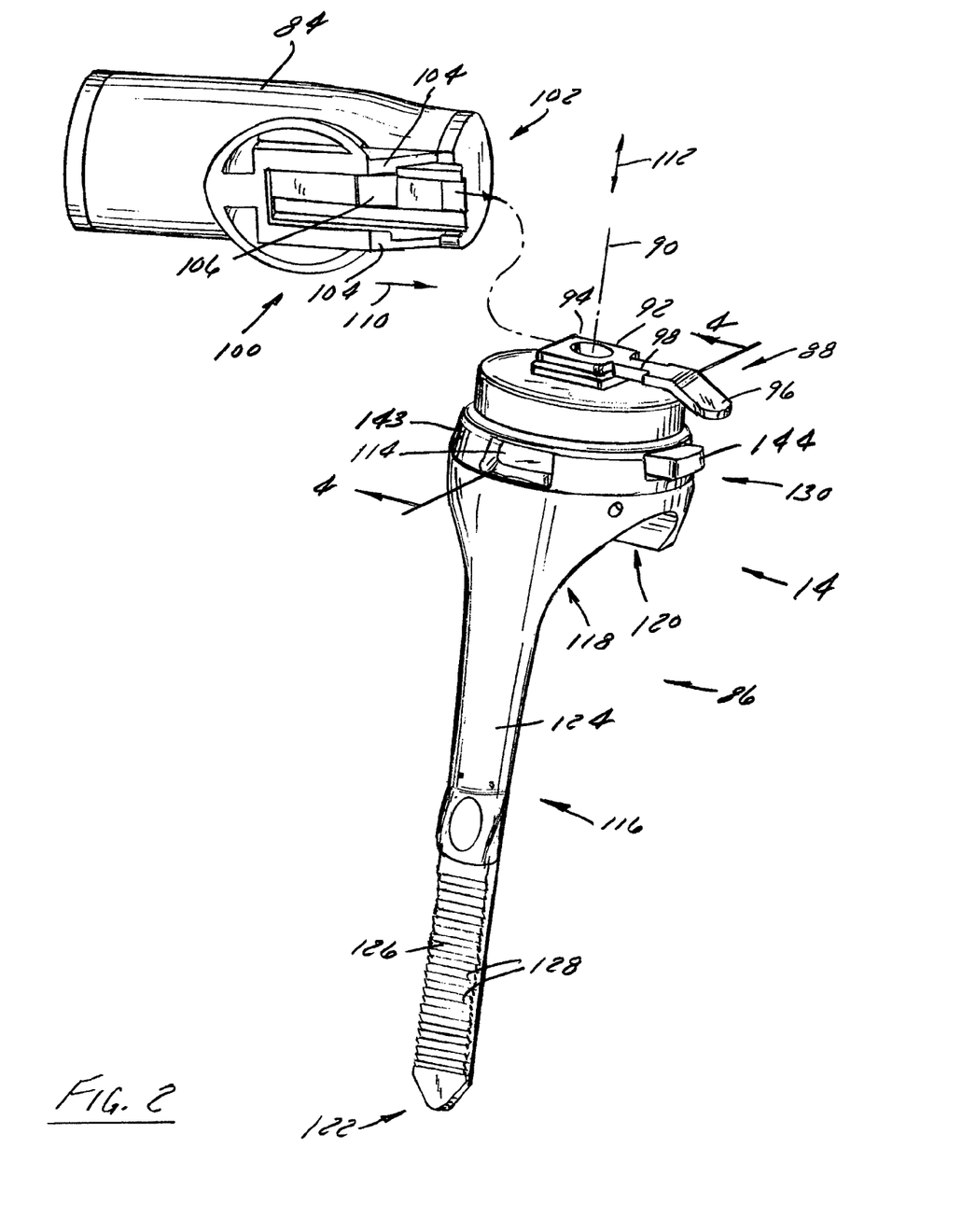
FIG. 2 is a perspective view of the accessory mounting system shown in FIG. 1 removed from the bicycle and having the light remove therefrom and showing a bottom structure of the light.

Referring to FIGS. 1 and 2, accessory mounting system 14 includes a cycling accessory, such as a light 84, which is removably secured to mounting system 14. As shown in FIG. 2, accessory mounting system 14 includes a first portion or body 86 and a second, adapter portion, or cap 88. Cap 88 is rotationally connected to body 86 such that cap 88 can rotate 360 degrees about an axis 90 relative to body 86. Cap 88 includes a projection 92 having a pair of arms 94 that extend from generally opposite sides of projection 92. An operator or tab 96 extends from projection 92 and includes a rib or lip 98 formed thereon.

Light 84 includes engagement area 100 formed therein. Engagement area 100 includes a channel 102 and a pair of shoulders 104 that extend partially over channel 102. Engagement area 100 includes a catch 106 formed in channel 102. Engagement area 100 is constructed to removably engage cap 88. Translation of light 84 in a direction, indicated by arrow 110, relative to cap 88 of accessory mounting system 14 slidably translates arms 94 of cap 88 relative to shoulders 104 of engagement area 100. The engagement between arms 94 and shoulders 104 prevents movement a light 84 relative to mounting system 14 in a longitudinal direction, indicated by arrow 112, as well as other directions generally not aligned with direction 110.

When projection 92 is fully translated into channel 102, lip 98 of tab 96 snap-fittingly engages catch 106 of light 84 thereby preventing removal of light 84 from cap 88. Operator manipulation of tab 96 disengages lip 98 from catch 106 thereby allowing light 84 to be removed from accessory mounting system 14. Such a construction allows a user to single-handedly remove and/or engage light 84 with accessory mounting system 14.

Body 86 of accessory mounting system 14 includes a passage 114 that is formed generally between body 86 and cap 88. A pliable member or strap 116 extends from body 86 and includes a first end 118 that is secured to body 86 proximate an open end 120 of body 86. Strap 116 includes a second end 122 that is selectively engageable with passage 114 of body 86 to close open end 120.

Strap 116 includes a first portion 124 constructed of a first material and a second portion 126 constructed of a second material. Preferably, the material of first portion 124 is more elastic than the material of second portion 126. More preferably, first portion 124 is formed of a rubber material and second portion 126 is constructed of a metal or plastic material. First and second portions 124, 126 of strap 116 and body 86 are co-molded and have a generally unitary and yet deformable construction.

A number of ribs or teeth 128 are formed on second portion 126 of strap 116. Second portion 126 of strap 116 is constructed to removably engage passage 114 such that strap 116 and body 86 can define a variable sized opening. As discussed further below, the pliability of strap 116 further allows accessory mounting system 14 to be engaged with a variety of structures and a variety of structure cross-sectional sizes and shapes. An operator 130 is attached to body 86 and controls the removable engagement accessory mounting system 14 with an underlying structure.

Figure 3:
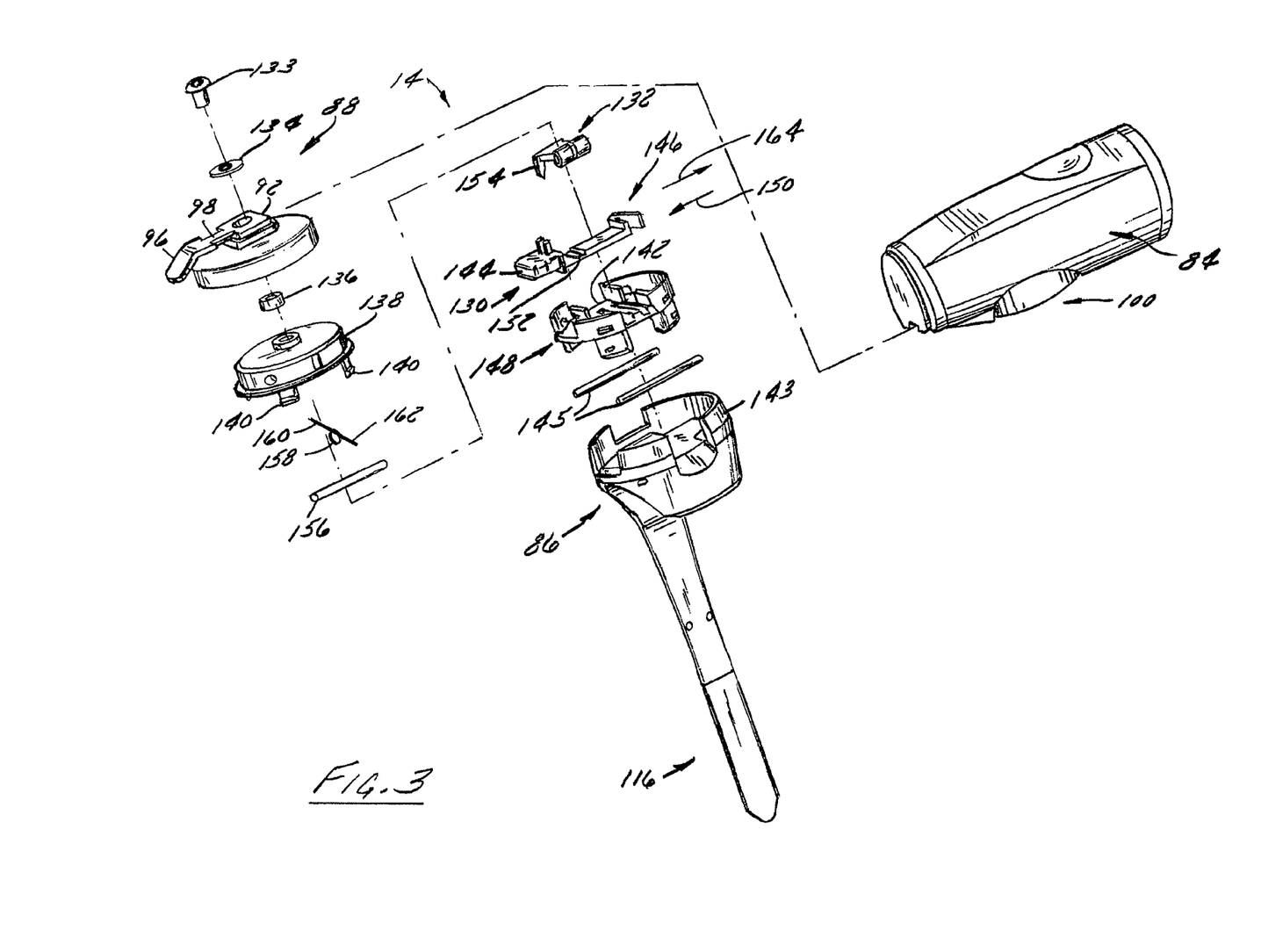
FIG. 3 is an exploded view of the accessory mounting system shown in FIG. 2.

Referring to FIG. 3, each of the number of teeth 128 of strap 116 are operationally engageable with a catch 132 that is secured to body 86. A pivot 133, a washer 134, and a bushing 136 rotationally secure cap 88 to a mid-member 138. Mid-member 138 includes a number of tabs 140 that snap fittingly engage a mid-plate 142 that is connected to a lower portion 143 of body 86 by a pair of pins 145. Operator 130 includes a button portion 144 positioned at one end and a spring tab 146 position at another end of operator 130. Operator 130 slidably engages a channel 148 formed in mid-plate 142 such that spring tab 146 biases operator 130 in a first or non-actuated direction, indicated by arrow 150.

Operator 130 includes a ramp 152 disposed between button portion 144 and spring tab 146. Ramp 152 engages a finger 154 that extends from catch 132 such that translation of operator 130 in a second direction, or an actuation direction, indicated by arrow 164, translates catch 132 is a crossing direction relative to the directions of travel 150, 164 of operator 130.

Figure 4:
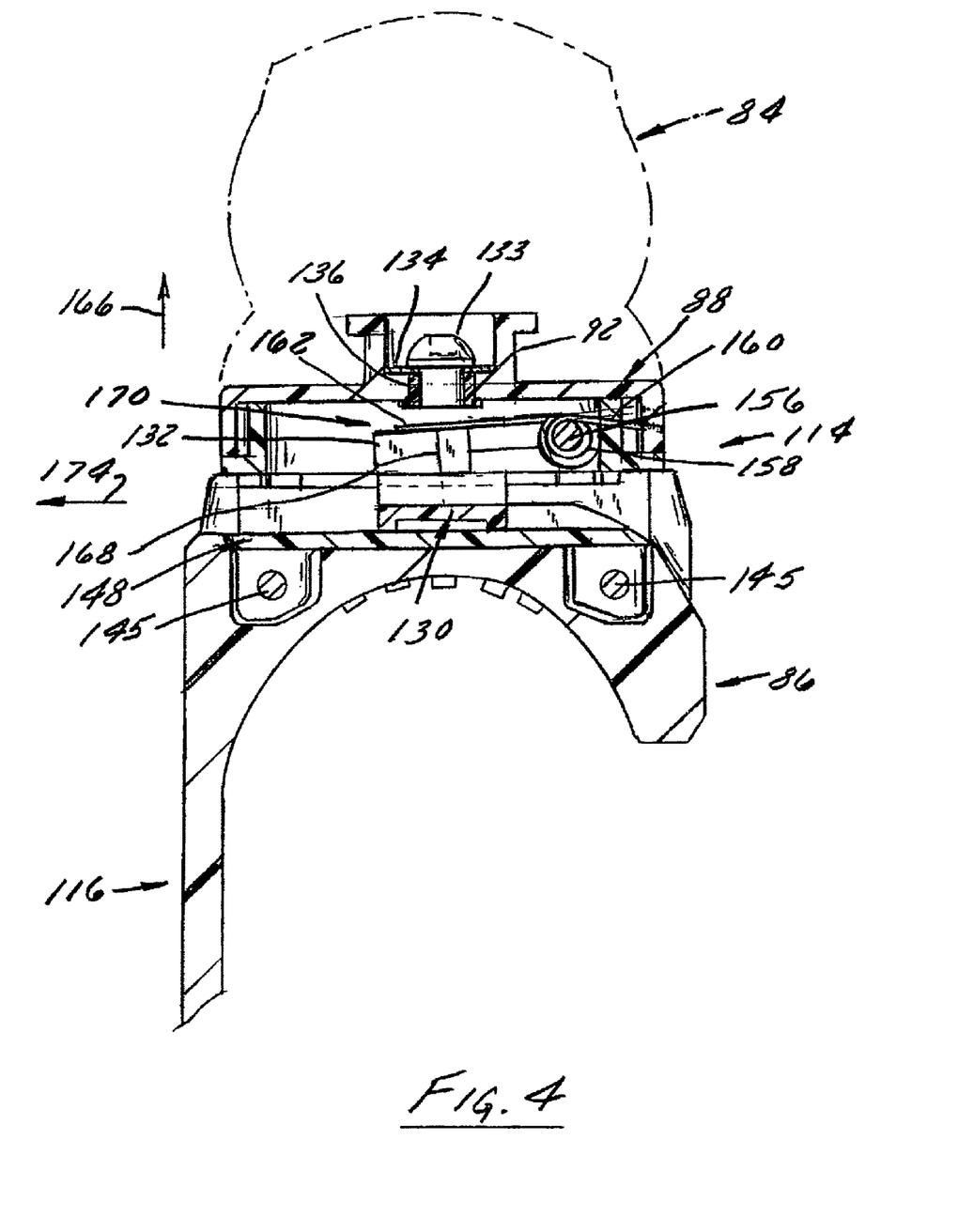
FIG. 4 is a cross-sectional view of a catch portion of the accessory mounting system taken along line 4-4 shown in FIG. 3.

Referring to FIGS. 3 and 4, a pivot 156 secures catch 132 to mid-member 138. A spring 158 includes a first arm 160 and a second arm 162 that are disposed between catch 132 and mid-member 138. Spring 158 biases catch 132 in a downward direction such that finger 154 slidably engages operator 130 proximate ramp 152. User manipulation of button portion 144 of operator 130 overcomes the bias of spring tab 146 and translates the operator in direction 164 relative to mid-plate 142. Movement of operator 130 in direction 164 translates finger 154 along ramp 152, overcoming the bias of spring 158, and translates catch 132 in an upward direction, indicated by arrow 166, as shown in FIGS. 4 and 5.

Figure 5:
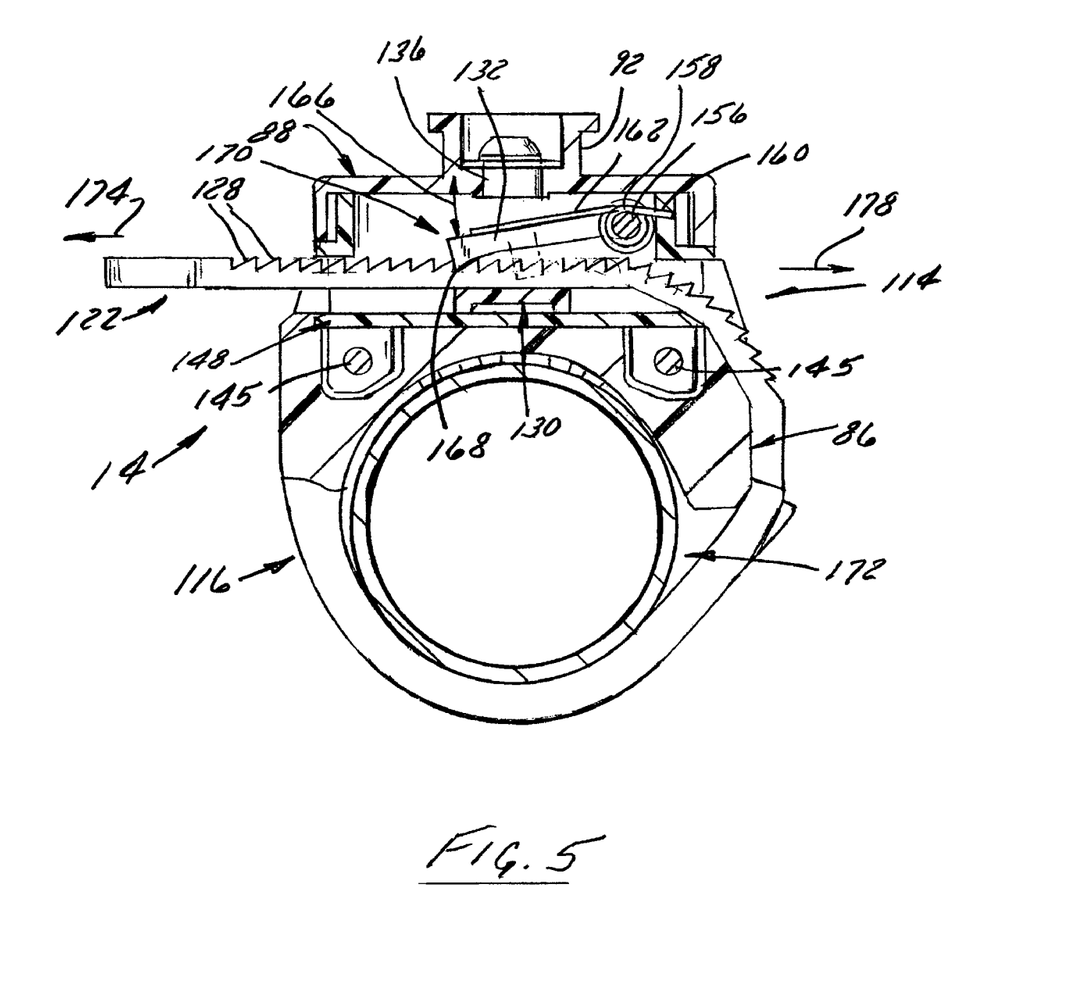
FIG. 5 is a view similar to FIG. 4 with both ends of a strap portion of the mounting system secured to a body such that the mounting system is configured to engage a cycling or support structure.

Referring to FIGS. 4 and 5, a stop 168 is formed at a distal end 170 of catch 132. When strap 116 is passed into passage 114 of body 86, catch 132 and stop 168 deflect over any of a number of teeth 128. When strap 116 is passed into passage 114, an opening, passage, or clamp area 172 is enclosed between strap 116 and body 86. Teeth 128 and stop 168 allow area 172 to be provided in any of a variety of sizes. That is, the more teeth 128 that pass stop 168, the smaller area 172 or the greater the clamping force associated with area 172. The pliability of strap 116 allows area 172 to take virtually any shape.

Translation of strap 116 through passage 114 in a first or tightening direction, indicated by arrow 174, allows catch 132 and stop 168 to ratchet along teeth 128 until a desired shape, size, and/or tension of area 172 is achieved. Once the desired parameters of area 172 are achieved, spring 158 biases stop 168 into a respective groove 176 formed between adjacent teeth 128 of strap 116. When stop 168 of catch 132 is engaged with a respective groove 176 of strap 116, both ends 118, 122 of strap 116 are effectively secured to body 86. The engagement of stop 168 with a respective groove 176 prevents unintentional or undesired translation of strap 116 in a removal or loosening direction, indicated by arrow 178, relative to body 86.

Referring to FIGS. 3-5, to remove accessory mounting system 14 from an underlying structure positioned in area 172, a user depresses button portion 144 of operator 130 thereby translating operator 130 in direction 164 relative to body 86. Translation of operator 130 in direction 164 translates catch 132 in direction 166 over the biasing force of spring 158. Translation of catch 132 in direction 166 disengages stop 168 from a respective groove 176 thereby allowing strap 116 to freely translate in removal or loosening direction 178. Such a construction allows for the single-handed disengagement of accessory mounting system 14 from an underlying or supporting structure positioned in area 172. Accessory mounting system 14 allows a user to single-handedly remove light 84 from body 86 and/or single-handedly remove accessory mounting system 14 from an underlying structure, or both. With some experience, it is envisioned that a user could also single handedly secure accessory mounting system 14 to an underlying structure.

It is appreciated that accessory mounting system 14 provides a simple and efficient means of attaching any of a number of accessories to underlying structures having a variety of constructions, configurations, shapes, and sizes. That is, although accessory mounting system 14 is shown as generally receiving light 84, other accessories, such as containers, electrical devices, cycling tools, lights of alternating intensities, or the like may be quickly and efficiently secured to a bicycle. Such accessories would merely need be provided with an interface structure having a construction similar to engagement area 100 of light 84.

It is further appreciated that although accessory mounting system 14 is shown in FIG. 1 as being secured to handlebar assembly 18, other locations and/or underlying support structures are envisioned. That is, accessory mounting system 14 can be quickly and efficiently removably secured to any portion of bicycle 10 such as frame 12, seat post 20, seat tube 22, stem tube 30, etc. It is further envisioned and within the scope of the claims that accessory mounting system 14 be engaged with other support structures such as a rider's apparel, a rider's helmet, or otherwise supported by a rider. The deformability of strap 116 as well as the ability of accessory mounting system 14 to provide area 172 in a variety of shapes and sizes allows accessory mounting system 14 to be quickly and efficiently removably secured to any of these underlying support structures. Accordingly, accessory mounting system 14 provides in accessory mounting system that is highly versatile and functional.

Therefore, one embodiment of the invention includes an accessory mounting system having a body with a passage and an open end. A cap portion is rotatably connected to the body generally opposite the open end. A first operator is connected to the cap portion for selectively securing an accessory to the body. A pliable member includes a first end that is connected to the body and a second end normally not connected to the body. The pliable member has a number of ribs and is adapted for passing into the passage of the body. A second operator is connected to the body and is adapted to releasably engage a rib to selectively secure the second end to the body and to close the open end of the body.

Another embodiment includes a bicycle light mount that has a first portion and a second portion that is rotatably connected to the first portion. The second portion is also constructed to removably engage a light. A strap is connected to the first portion and is constructed of a first material. A portion of the strap also includes a number of ribs that are formed of a second material. A latch is connected to the first portion and is constructed to selectively engage the number of ribs of the strap so as to form a closed passage having a variable cross-sectional area.

A further embodiment includes a bicycle accessory mounting system that has a mount portion and an adapter portion. The adapter portion is rotatably connected to the mount portion and is constructed to removably engage a bicycle accessory. The system includes a strap that has one end connected to the mount portion and another end removably engageable with the mount portion to define a closed clamp section. A plurality of teeth extend from a portion of the strap. A catch is attached to the mount portion and is constructed to engage a first tooth and a second tooth such that, the closed clamp section has a first area when the catch is engaged with the first tooth and a second area when the catch is engaged with the second tooth.

The present invention has been described in terms of the preferred embodiment, and it is recognized that equivalents, alternatives, and modifications, aside from those expressly stated, are possible and within the scope of the appending claims. It is further understood and appreciated that that the various aspects, features, and embodiments disclosed herein are not solely or mutually exclusive.

What is claimed is:

1. An accessory mounting system comprising:
   a body having a passage and an open end;
   a cap portion rotatably connected to the body generally opposite the open end;
   a first operator connected to the cap portion for selectively securing an accessory to the body, the cap portion being connected to the body so that the cap portion is rotatable relative to the body when the accessory is engaged with the cap portion and positionally fixed relative to a longitudinal direction associated with an axis of rotation between the cap portion and the body;
   a pliable member having a first end that is fixedly connected to the body and a second end that is moveably connected to the body, the pliable member having a number of ribs and adapted for slidable cooperation with the passage; and
   a second operator connected to the body and adapted to releasably engage a rib to selectively define the orientation of the second end to the body and to close the open end of the body.

2. The accessory mounting system of claim 1 wherein the accessory is a light.

3. The accessory mounting system of claim 1 wherein the body includes a curved surface that faces the pliable member when the pliable member is engaged with the passage.

4. The accessory mounting system of claim 1 wherein the first and second operators are biased to a position to engage the accessory and the rib, respectively.

5. The accessory mounting system of claim 1 wherein the cap portion can rotate 360 degrees relative to the body about an axis oriented in a crossing direction with a longitudinal axis of a space closed by the open end of the body and the pliable member.

6. The accessory mounting system of claim 1 wherein the number of ribs are a plastic material and the pliable member is a rubber material and the plastic material is co-molded with the pliable member.

7. The accessory mounting system of claim 1 wherein the pliable member is continuous from the first end to the second end and the number of ribs cooperate with the second operator to enclose a variable sized cavity.

8. A bicycle light mount comprising:
   a first portion;
   a second portion rotatably connected to the first portion and constructed to removably engage a light, the second portion being rotatably connected to the first portion to allow independent positioning of the second portion relative to the first portion when the light is engaged therewith and by altering a rotational position of the first portion relative to the second portion without altering an orientation of the first portion relative to the second portion along an axis of rotation between the first portion and the second portion;
   a strap connected to the first portion, the strap constructed of a first material and having a number of ribs formed of a second material; and
   a latch connected to the first portion and constructed to selectively engage the number of ribs of the strap so as to form a closed passage having a variable cross-sectional area.

9. The bicycle light mount of claim 8 further comprising a catch connected to the second portion and constructed to engage the bicycle light to selectively secure the light to the first portion.

10. The bicycle light mount of claim 8 wherein the second portion can rotate 360 degrees relative to the first portion and will maintain a selected relative orientation of the first portion and the second portion.

11. The bicycle light mount of claim 8 wherein the first material is rubber based and the second material is one of metal based or plastic based.

12. The bicycle light mount of claim 8 wherein the variably cross-sectional area is generally similar to one of a cross-section of a handlebar, a cross-section of a portion of a bicycle frame, a cross-section of a bicycle seat structure, a cross-section of a portion of a bicycle helmet, and a bicycle accessory.

13. The bicycle light mount of claim 8 wherein the strap is a generally continuous body wherein one end of the body is fixedly connected to the first portion of the bicycle light mount and a second end of the body movably cooperates with the latch.

14. The bicycle light mount of claim 13 wherein the latch further comprises a channel formed through the first portion for receiving the strap and a button for disengaging a tab with a rib, the channel and the button being oriented generally transverse to one another.

15. The bicycle light mount of claim 8 wherein the second portion is constructed to cooperatively engage a light having a first intensity and another light having a second intensity.

16. A bicycle accessory mounting system comprising:
a mount portion;
an adapter portion rotatably connected to the mount portion and constructed to removably engage a bicycle accessory, the adapter portion being rotatably connected to the mount portion but positionally fixed in a direction aligned with an axis of rotation between the adapter portion and the mount portion regardless of a rotational orientation of the adapter portion relative to the mount portion;
a strap having one end connected to the mount portion and another end that is adjustably engageable with the mount portion to define a closed clamp section;
a plurality of teeth extending from a portion of the strap; and
a catch attached to the mount portion and constructed to engage a first tooth such that the closed clamp section has a first area and to engage a second tooth such that the closed clamp section has a second area.

17. The mounting system of claim 16 configured to provide a number of closed clamp section areas similar to a number of the plurality of teeth.

18. The mounting system of claim 16 wherein the plurality of teeth is formed of a first material and the strap is formed of a second material that is less elastic than the first material.

19. The mounting system of claim 16 wherein the strap is continuous from the one end to the another end.

20. The mounting system of claim 16 wherein the adapter portion is constructed to alternately engage a first bicycle accessory and a second bicycle accessory.

* * * * *